(12) United States Patent
Han et al.

(10) Patent No.: US 7,190,855 B2
(45) Date of Patent: Mar. 13, 2007

(54) DUAL-BAND WAVELENGTH DIVISION MULTIPLEXER

(75) Inventors: Dong-Kyoon Han, Seongnam-si (KR); Kyoung-Youm Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 70 days.

(21) Appl. No.: 10/935,648

(22) Filed: Sep. 7, 2004

(65) Prior Publication Data
US 2005/0152641 A1    Jul. 14, 2005

(30) Foreign Application Priority Data
Jan. 8, 2004    (KR) ...................... 10-2004-0001178

(51) Int. Cl.
*G02B 6/28* (2006.01)
(52) U.S. Cl. .............................. 385/24; 385/28; 385/39
(58) Field of Classification Search .................. 385/24, 385/28, 39
See application file for complete search history.

(56) References Cited

U.S. PATENT DOCUMENTS

| | | | | |
|---|---|---|---|---|
| 5,414,548 A * | 5/1995 | Tachikawa et al. | ........... | 398/87 |
| 5,546,483 A * | 8/1996 | Inoue et al. | ........... | 385/14 |
| 6,563,988 B2 * | 5/2003 | McGreer | ........... | 385/43 |
| 6,985,648 B2 * | 1/2006 | Kish et al. | ........... | 385/14 |
| 2004/0101243 A1 * | 5/2004 | Kim et al. | ........... | 385/37 |
| 2006/0067619 A1 * | 3/2006 | Welch et al. | ........... | 385/37 |

FOREIGN PATENT DOCUMENTS

| | | |
|---|---|---|
| JP | 08-201737 | 8/1996 |
| JP | 10-090550 | 4/1998 |
| JP | 10-197735 | 7/1998 |

\* cited by examiner

*Primary Examiner*—Ellen E. Kim
(74) *Attorney, Agent, or Firm*—Cha & Reiter, LLC

(57) ABSTRACT

A dual-band wavelength division multiplexer is disclosed. The multiplexer includes a first and a second slab waveguide, a plurality of channel waveguides connecting the first slab waveguide to the second slab waveguide, an input part connected to the first slab waveguide, and an output part connected to the second slab waveguide. The input part includes an input waveguide for receiving an optical signal from an exterior, and a wavelength division multiplexing filter connected to the input waveguide, for outputting an optical signal in a first band to a first connecting waveguide, and outputting an optical signal in a second band to a second connecting waveguide. The input part also includes a first mode converter connected to the wavelength division multiplexing filter through the first connecting waveguide, for mode-converting the inputted optical signal in the first band and a second mode converter connected to the wavelength division multiplexing filter through the second connecting waveguide, for mode-converting the inputted optical signal in the second band. An output mode of the first mode converter has a width different from that of an output mode of the second mode converter.

7 Claims, 7 Drawing Sheets

DUAL-BAND WAVELENGTH DIVISION MULTIPLEXER

CLAIM OF PRIORITY

This application claims priority to an application entitled "Dual-band wavelength division multiplexer," filed in the Korean Intellectual Property Office on Jan. 8, 2004 and assigned Ser. No. 2004-1178, the contents of which are hereby incorporated by reference.

BACKGROUND OF THE INVENTION

1. Field of the Invention

The present invention relates to an optical device, and more particularly to a wavelength division multiplexer.

2. Description of the Related Art

An arrayed waveguides grating (hereinafter, referred to as an AWG) can be used as a wavelength division multiplexer/demultiplexer in an optical transport network. If the AWG has a box-like flat transmission band characteristic, it is called a flat-top AWG. Flat-top AWGs can increase the drift tolerance of a wavelength of a light source. When the flat-top AWG is continuously used, an entire transmission bandwidth can also be maintained. FIG. 1 is a diagram showing the construction of a typical flat-top AWG FIG. 2 is an enlarged diagram of an input part in FIG. 1. FIG. 3 is an enlarged diagram of an output part in FIG. 1.

As shown in FIG. 1, the AWG 100 includes an input waveguide 110, a mode converter 120, a first slab waveguide 130, a plurality of channel waveguides 140, a second slab waveguide 150, a plurality of output waveguides 160.

Referring to FIG. 2, the mode converter 120 expands the width of a mode 170 of an optical signal input from the input waveguide 110. As a result, fundamental mode 172 and a secondary mode 174 are generated. The mode converter 120 also adjusts the energy distribution between the modes 172 and 174. A mode 176 of an optical signal incident into an end surface 132 of the first slab waveguide 130 is converted from a Gaussian function shape to a flat-top shape. The mode 176 includes a flat zone having a width of $\Delta F_5$.

When the flat-top AWG 100 is used in two bands (e.g., O-band and C-band) which have a large wavelength difference, a difference between transmission bandwidths occurs. Referring to FIG. 3, when a wavelength shifts from a transmission central wavelength $\lambda_c$ by $\Delta\lambda$, an image 178 (has a similar shape as that of the mode 176 of the optical signal incident into the first slab waveguide 130) formed on an end surface 152 of the second slab waveguide 150 has a spatial positional variation $\Delta x$ defined by equation 1.

$$\Delta x = \frac{dx}{d\lambda} \times \Delta\lambda \qquad \text{Equation 1}$$

In equation 1, $$\frac{dx}{d\lambda}$$

represents positional variation (or a distance by which a focus of an image plane moves) of an image with respect to a unit wavelength variation for the transmission central wavelength $\lambda_c$, and is defined by equation 2.

$$\frac{dx}{d\lambda} = \frac{N_c f \Delta L}{n_s d \lambda_c} \qquad \text{Equation 2}$$

In equation 2, $$N_c \left(= n_c - \lambda \frac{dn_c}{d\lambda}\right),$$

where $n_c$ represents an effective refractive index of the channel waveguides 140) represents a group refractive index of the channel waveguides 140, f represents lengths (or focal lengths of the channel waveguides 140) of the first and the second slab waveguide 130 and 150, $\Delta L$ represents difference of lengths between adjacent channel waveguides 140, $n_s$ represents effective refractive indices of the first and the second slab waveguide 130 and 150, and d represents intervals between adjacent channel waveguides 140.

When a width of a flat zone of the image 178 formed on the end surface 152 of the second slab waveguide 150 is $\Delta F_6 (\approx \Delta F_5)$, the flat transmission bandwidth $\Delta f$ is defined by equation 3.

$$\Delta f = \Delta F_6 \bigg/ \frac{dx}{d\lambda} = \frac{n_s d \Delta F_6}{N_c f \Delta L} \lambda_c \qquad \text{Equation 3}$$

Accordingly, when the flat-top AWG 100 is used in two bands, $\Delta f$ has difference. Hereinafter, the O-band and C-band will be described as an example. Difference of $$\frac{dx}{d\lambda}$$

in two bands is about 17%, but $\Delta F_6$ shows nearly no difference since the two bands use the same mode converter 120. In result, the transmission bandwidths have difference of about 17%.

As describe above, it is difficult to use the typical flat-top AWG in two bands due to the difference between transmission bandwidths.

SUMMARY OF THE INVENTION

One aspect of the present invention is to provide a dual-band wavelength division multiplexer which has the same or nearly the same transmission bandwidths in two bands.

One embodiment of the present invention is directed to a dual-band wavelength division multiplexer including a first and a second slab waveguide, a plurality of channel waveguides connecting the first slab waveguide to the second slab waveguide, an input part connected to the first slab waveguide, and an output part connected to the second slab waveguide. The input part includes an input waveguide for receiving an optical signal from an exterior, a wavelength division multiplexing filter connected to the input waveguide, for outputting an optical signal in a first band to a first connecting waveguide, and outputting an optical signal in a second band to a second connecting waveguide.

The input part also includes a first mode converter connected to the wavelength division multiplexing filter through the first connecting waveguide, for mode-converting the inputted optical signal in the first band, and a second mode converter connected to the wavelength division multiplexing filter through the second connecting waveguide, for mode-converting the input optical signal in the second band. An output mode of the first mode converter has a width different from that of an output mode of the second mode converter.

Another embodiment of the present invention is directed to wavelength division multiplexer including an input waveguide for receiving an optical signal, a wavelength division multiplexing filter, connected to the input waveguide, arranged to provide a plurality of optical signals in a plurality of bands to a plurality of connecting waveguides and a plurality of mode converters, connected to the wavelength division multiplexing filter through the plurality connecting waveguides, arranged to mode-convert the plurality of optical signals. At least two of the output modes of the plurality of mode converters have different widths.

Yet another embodiment of the present invention is directed to a wavelength division multiplexer including a first and a second slab waveguide and a plurality of channel waveguides connecting the first slab waveguide to the second slab waveguide. The multiplexer also includes a means, connected to the first slab waveguide, and an output part connected to the second slab waveguide, for equalizing mode widths of optical signals input to the first slab waveguide differing from each other according to bands.

BRIEF DESCRIPTION OF THE DRAWINGS

The above and other aspects, features and embodiments of the present invention will be more apparent from the following detailed description taken in conjunction with the accompanying drawings, in which.

DETAILED DESCRIPTION

Hereinafter, embodiments of the present invention will be described with reference to the accompanying drawings. For the purposes of clarity and simplicity, a detailed description of known functions and configuration incorporated herein will be omitted as it may obscure the subject matter of the present invention.

Figure 1:
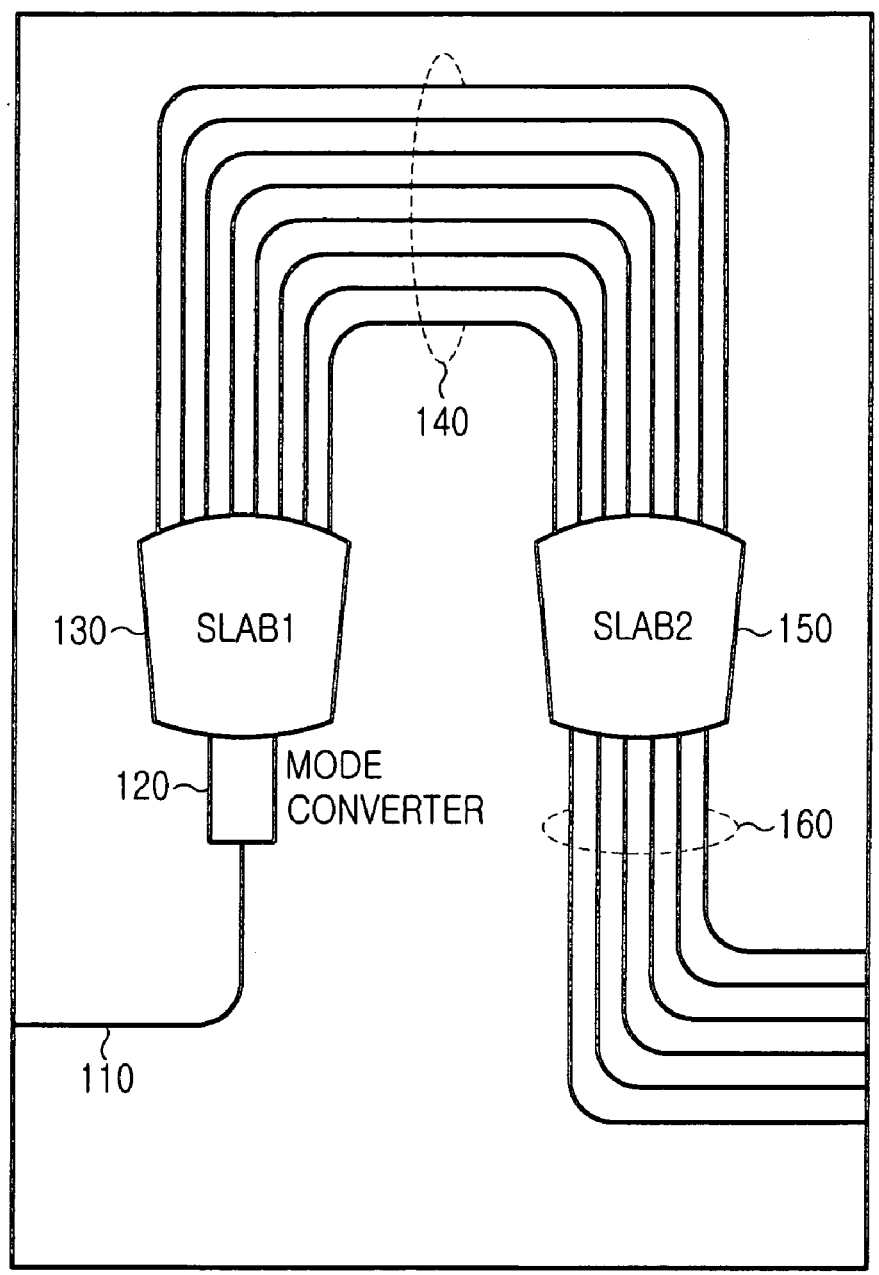
FIG. 1 is a diagram showing the construction of a typical flat-top AWG.
Figure 2:
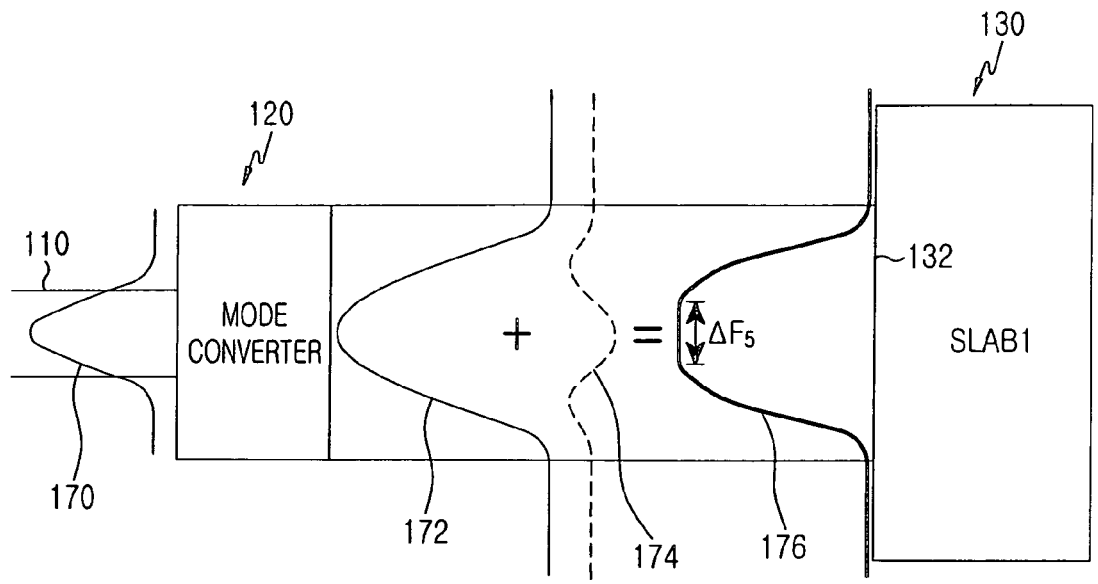
FIG. 2 is an enlarged diagram of an input part in FIG. 1.
Figure 3:
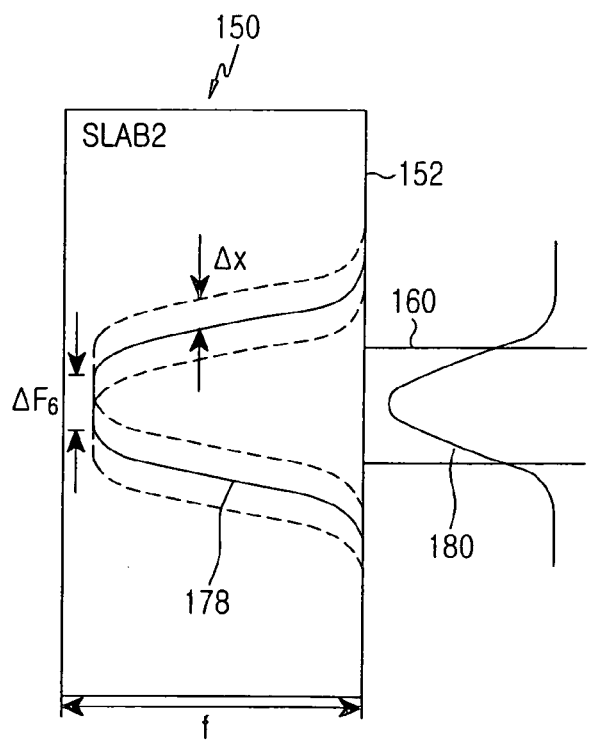
FIG. 3 is an enlarged diagram of an output part in FIG. 1.
Figure 4:
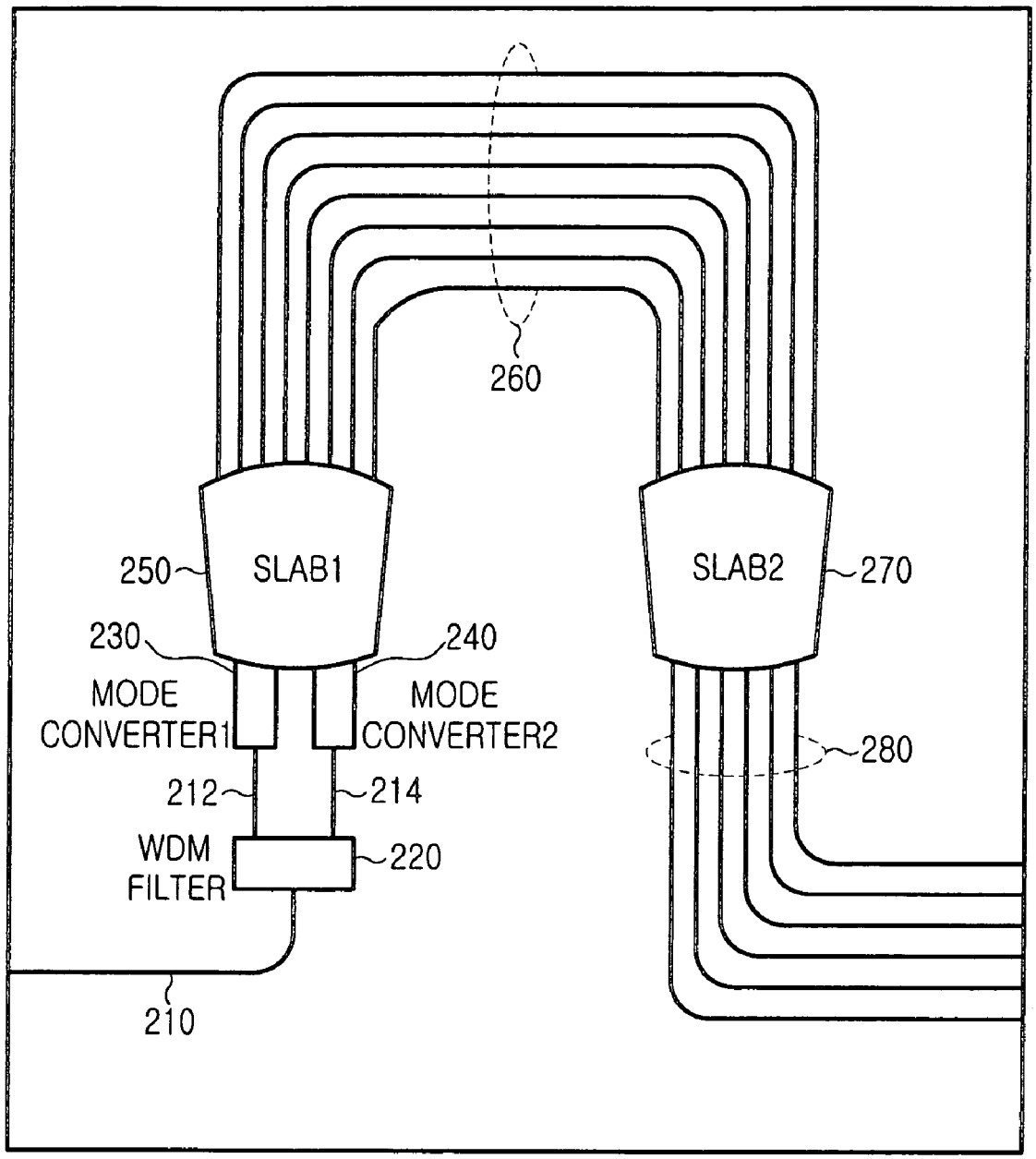
FIG. 4 is a diagram showing the construction of a dual-band wavelength division multiplexer according to one embodiment of the present invention.
Figure 5:
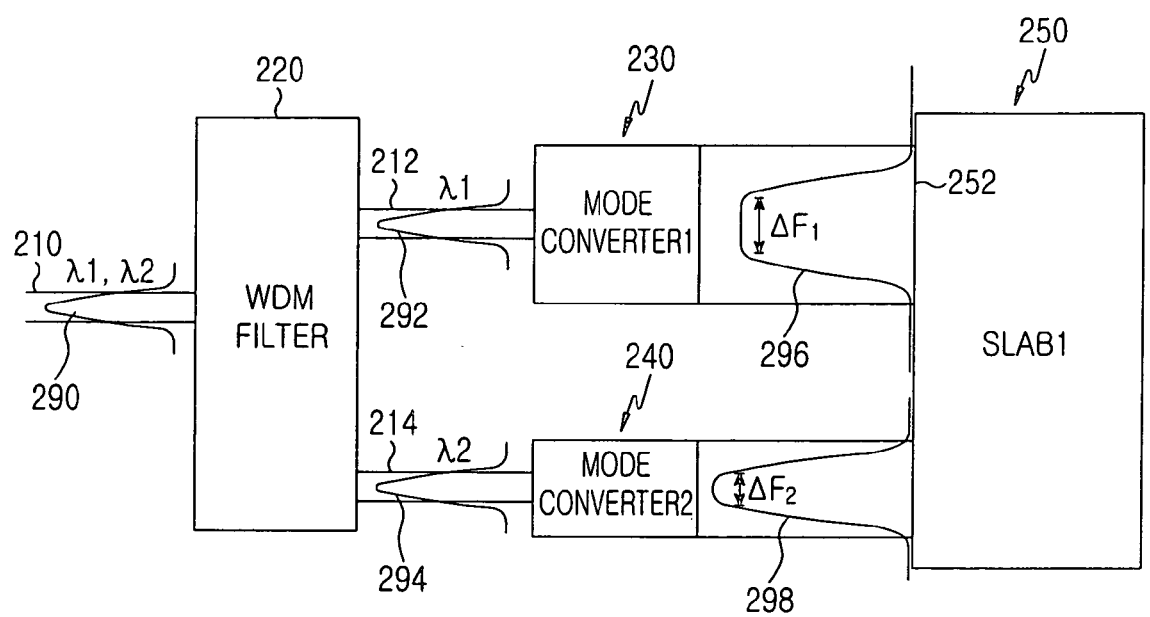
FIG. 5 is a diagram showing an input part of the wavelength division multiplexer shown in FIG. 4.
Figure 6:
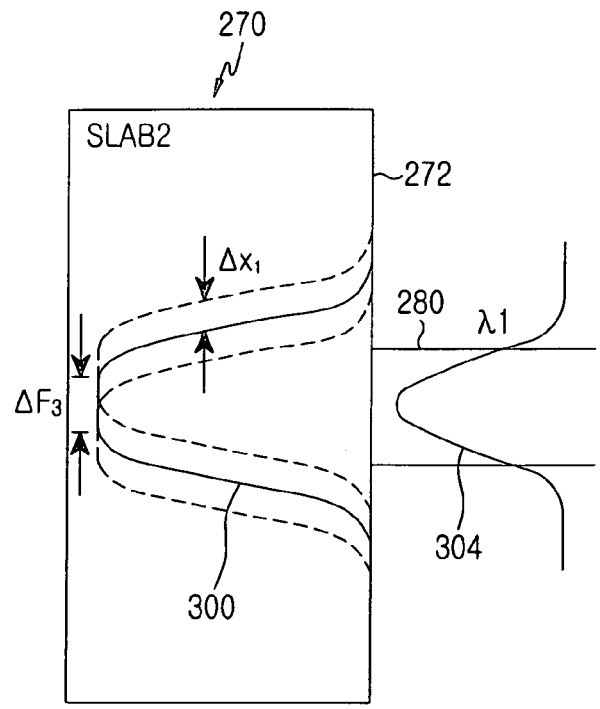
FIGS. 6 and 7 are diagram showing an output part of the wavelength division multiplexer shown in FIG. 4.
Figure 7:
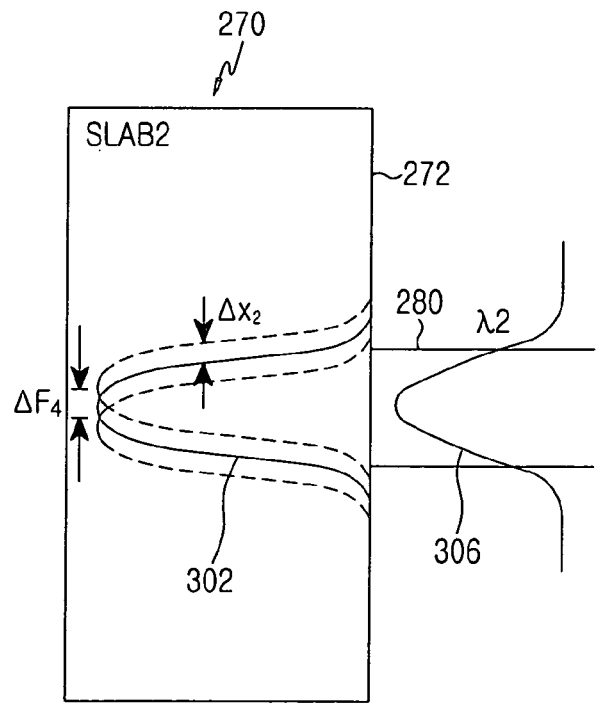

FIG. 4 is a diagram showing the construction of a dual-band wavelength division multiplexer according to one embodiment of the present invention. FIG. 5 is a diagram showing an input part of the wavelength division multiplexer shown in FIG. 4. FIGS. 6 and 7 are diagrams showing an output part of the wavelength division multiplexer shown in FIG. 4.

The wavelength division multiplexer 200 includes an input waveguide 210, a wavelength division multiplexing filter 220, a first and a second connecting waveguide 212 and 214, a first and a second mode converter 230 and 240, a first and a second slab waveguide 250 and 270, a plurality of channel waveguides 260, and, a plurality of output waveguides 280.

The input waveguide 210 receives an optical signal 290 belonging to a first or a second band. In this embodiment, the first band is a band shorter than the second band. For example, the first band may be a O-band and the second band may be a C-band.

The wavelength division multiplexing filter 220 is disposed between the input waveguide 210 and the first and the second connecting waveguide 212 and 214. The wavelength division multiplexing filter 220 outputs an optical signal 292 (hereinafter, referred to as a first optical signal) belonging to the first band, which is input from the input waveguide 210, to the first connecting waveguide 212. The wavelength division multiplexing filter 220 also outputs an optical signal 294 (hereinafter, referred to as a second optical signal) belonging to the second band to the second connecting waveguide 214. The wavelength division multiplexing filter 220 may also include a directional coupler, a multimode interference coupler, a Mach-Zender interferometer, and a thin film filter inserted into a planar lightwave circuit (PLC) substrate. A central wavelength of the first band is $\lambda_1$, a central wavelength of the second band is $\lambda_2$, and $\lambda_1 < \lambda_2$.

The first mode converter 230 is disposed between the first connecting waveguide 212 and the first slab waveguide 250. The first mode converter 230 mode-converts the first optical signal 292 input from the first connecting waveguide 212 and outputs the converted signal. This allows the first optical signal 296 incident into an end surface 252 of the first slab waveguide 250 to include a flat zone having a width of $\Delta F_1$.

The second mode converter 240 is disposed between the second connecting waveguide 214 and the first slab waveguide 250. The second mode converter 240 mode-converts the second optical signal 294 input from the second connecting waveguide 214 and outputs the converted signal. This allows the second optical signal 298 incident into the end surface 252 of the first slab waveguide 250 to include a flat zone having a width of $\Delta F_2$.

In this example, $\Delta F_1$ is larger than $\Delta F_2$. An output mode of the first mode converter 230 has a width different from that of an output mode of the second mode converter 240. The first and the second mode converter 230 and 240 each may include a Y-branch waveguide, a multimode interference coupler, a horn waveguide shaped like a parabola, and a polynomial waveguide.

The first slab waveguide 250 is disposed between the first and the second mode converter 230 and 240 and the channel waveguides 260 and the first slab waveguide 250 diffracts the first and the second optical signal input from the first and the second mode converter 230 and 240.

The channel waveguides 260 is disposed between the first slab waveguide 250 and the second slab waveguide 270 and the channel waveguides 260 has different lengths according to a predetermined length difference $\Delta L$. The number of the channel waveguides 260 is set by considering the number of wavelengths to be processed by the wavelength division multiplexer 200.

The second slab waveguide 270 is disposed between the channel waveguides 260 and the output waveguides 280 and the second slab waveguide 270 converges lights having different phases, which are output from the channel waveguides 260, on an end surface 272 of the second slab waveguide 270. The converged positions change according to wavelengths.

FIG. 6 shows an image 300 of the first optical signal, which is formed on the end surface 272 of the second slab waveguide 270 and includes a flat zone having a width of $\Delta F_3$. FIG. 7 shows an image 302 of the second optical signal, which is formed on the end surface 272 of the second slab waveguide 270 and includes a flat zone having a width of $\Delta F_4$. Since there exists a relation of $$\frac{dx}{d\lambda}\lambda_1 > \frac{dx}{d\lambda}\lambda_2,$$

$\Delta x_1$ is larger than $\Delta x_2$. Also, since there exists a relation of $\Delta F_3 \approx \Delta F_1$ and $\Delta F_4 \approx \Delta F_2$, $\Delta F_3$ is larger than $\Delta F_4$.

The output waveguides 280 is connected to the second slab waveguide 270, and is disposed at the converged positions on the end surface 272 of the second slab waveguide 270 to output optical signals having different wavelengths.

In this embodiment of the present invention, variation of $$\frac{dx}{d\lambda}$$

according to bands is offset by variation (as a result, variation of a width $\Delta F$ of the flat zone of the image formed on the end surface 272 of the second slab waveguide 270) of a width $\Delta F$ of the flat zone of the optical signal incident into the end surface 252 of the first slab waveguide 250. This is done so that a constant transmission bandwidth $\Delta f$ is obtained.

Hereinafter, a design process of the wavelength division multiplexer 200 will be described.

First, the central wavelength of the first band is $\lambda_1$, the central wavelength of the second band is $\lambda_2$, and $\lambda_1 < \lambda_2$. In equation 2, since variation of $N_c/n_s$ may be ignored, $$\frac{dx}{d\lambda}$$

increases as a wavelength grows smaller. For instance, as it goes to the O-band, $$\frac{dx}{d\lambda}$$

increases. In contrast, as it goes to the L-band, $$\frac{dx}{d\lambda}$$

decreases. A design equation for allowing the wavelength division multiplexer 200 to operate in the two central wavelengths is as follows.

$$n_c(\lambda_1)\Delta L = m_1\lambda_1 \qquad \text{Equation 4}$$

$$n_c(\lambda_2)\Delta L = m_2\lambda_2 \qquad \text{Equation 5}$$

$$d = \frac{dx}{d\lambda}\bigg|_{\lambda_1} \times \Delta\lambda_1 = \frac{dx}{d\lambda}\bigg|_{\lambda_2} \times \Delta\lambda_2, \qquad \text{Equation 6}$$

$$\frac{N_c(\lambda_1)\Delta\lambda_1}{n_s(\lambda_1)\lambda_1} = \frac{N_c(\lambda_2)\Delta\lambda_2}{n_s(\lambda_2)\lambda_2}$$

$$m_1 = \frac{\lambda_1}{N_1\Delta\lambda_1} \qquad \text{Equation 7}$$

$$m_2 = \frac{\lambda_2}{N_2\Delta\lambda_2} \qquad \text{Equation 8}$$

In the equations, initial values are given, which are an effective refractive index $n_c$ of the channel waveguides 260, the number $N_2$ of virtual channels to be operated in the second band, a wavelength interval $\Delta\lambda_2$ between channels in the second band, and the central wavelength $\lambda_2$ of the second band. Accordingly, $m_2$ is determined by equation 8, and $\lambda_1$ which makes $m_1$ be an integral number and $m_1$ are determined in equation 4 by means of the length difference $\Delta L$ between the adjacent channel waveguides 260 calculated by equation 5. $\Delta\lambda_1$ is obtained through equation 6 by means of $\lambda_2$ and the calculated $\lambda_1$, and then $N_1$ is obtained by means of equation 7. The number $N_1$ of virtual channels to be operated in the first band must be larger than the original desired number of channels in the design. Otherwise, $N_1$ must be larger than a desired value by increasing the number $N_2$ of virtual channels and repeating the aforementioned processes.

The following is a description applying the above design process to O/C dual-band 16 channels AWG design. When initial values, that are $\lambda_2$ (1552.52 nm), $\Delta\lambda_2$ (0.8 nm), and $N_2$ (30.24), are given, $m_2$ becomes 60. When it is assumed that a waveguide having a core size of 6.5 μm×6.5 μm and a value of $\Delta n$ (=0.75%), since $n_c(\lambda_2)$=1.4513, $\Delta L$ becomes 64.18 μm. When this value is put into equation 4, $\lambda_1$ becomes 1315.02 nm and $m_1$ becomes 71. When this result is applied to equation 6, $\Delta\lambda_1$ becomes 0.68 nm. Further, when this value is put into equation 7, $N_1$ becomes 30.25. Accordingly, the 16 channels AWG having wavelength intervals 0.68 nm and 0.8 nm in central wavelengths 1315.02 nm and 1552.52 nm can be designed.

Since the central wavelengths and the wavelength intervals have been determined, the width $\Delta F$ of the flat zone of the optical signal incident into the end surface 252 of the first slab waveguide 250 must be determined in order to cause flat transmission bandwidths to be similar to each other. When the length f of the first and the second slab waveguide 250 and 270 is employed as 8190.11 μm and an interval d between the adjacent channel waveguides 260 is employed as 12 μm, $$\frac{dx}{d\lambda}(\lambda_1)$$

becomes 33.48 μm/nm and $$\frac{dx}{d\lambda}(\lambda_2)$$

becomes 28.34 μm/nm. Accordingly, $$\frac{dx}{d\lambda}$$

has difference of about 17%. Such a difference is offset by variation of the width ΔF of the flat zone of the first or the second optical signal incident into the end surface 252 of the first slab waveguide 250.

The following is a description when a horn waveguide shaped like a parabola is used as the first and the second mode converter 230 and 240. The horn waveguide is defined by equation 9.

$$W(t)=\sqrt{2\alpha\lambda_c tL+W_0^2}$$  Equation 9

In equation 9, $0 \leq t \leq 1$, W represents a line width of the horn waveguide, $\lambda_c$ represents a central wavelength, L represents a length of the horn waveguide, $W_0$ represents a width of an input terminal of the horn waveguide (or a line width at a starting point), and α is a parameter which determines variation degree of a line width.

Figure 8:
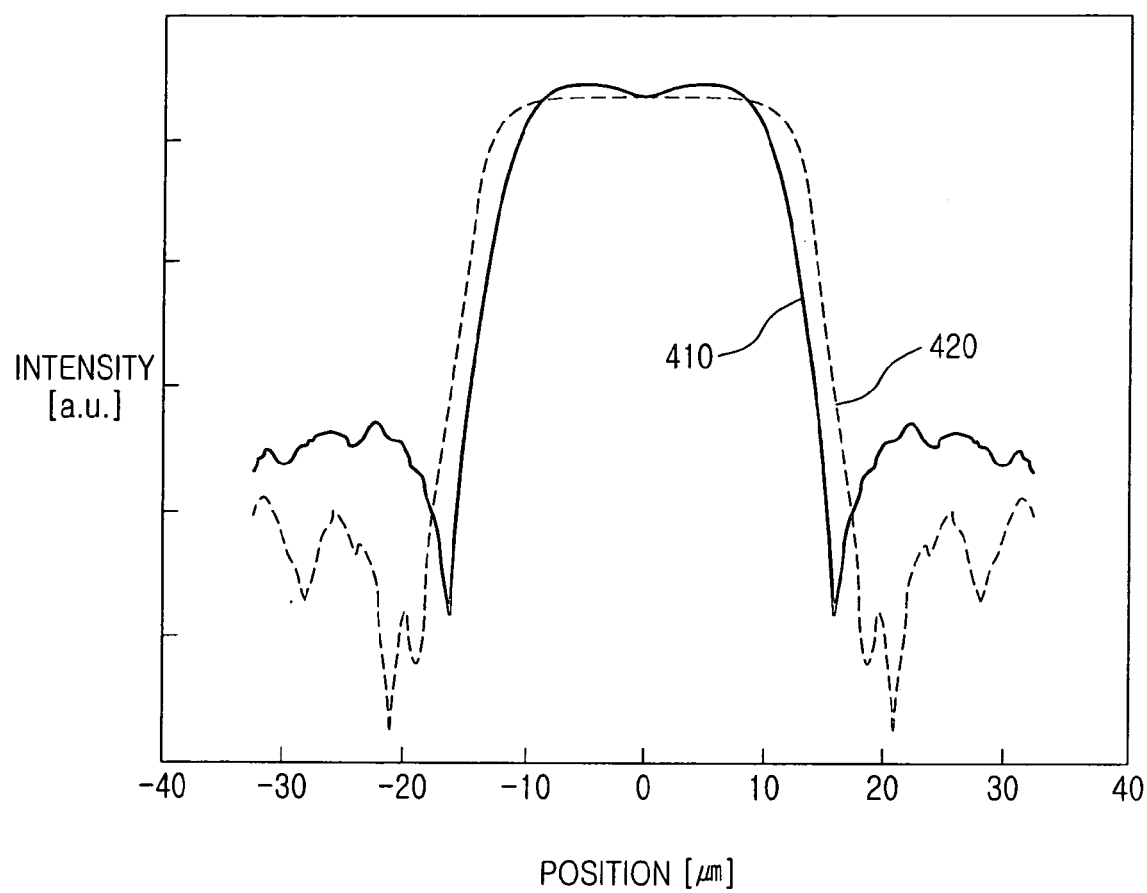
FIGS. 8 and 9 are graphs illustrating output characteristics of the wavelength division multiplexer shown in FIG. 4.

In a case of O-band, $\lambda_c$=1315.02 nm, α=0.80, and L=372 μm. In a case using C-band, $\lambda_c$=1552.52 nm, α=0.68, and L=248 μm. FIG. 8 shows a mode shape 420 of the first optical signal and a mode shape 410 of the second optical signal incident into the first slab waveguide 250. Referring to FIG. 8, $\Delta F_1$ (=23.40 μm) in the O-band increases by about 15% than $\Delta F_2$ (=20.35 μm) in the C-band on the basis of 3 dB bandwidth (BW). This can offset the difference of $$\frac{dx}{d\lambda}.$$

A loss penalty of a transmission band caused by such a bandwidth increase is smaller than about 1 dB. In order to equalize loss degree in the two bands with each other, insertion loss in the wavelength division multiplexing filter 220 is properly adjusted. Therefore, the loss degree can be equalized with each other.

Figure 9:
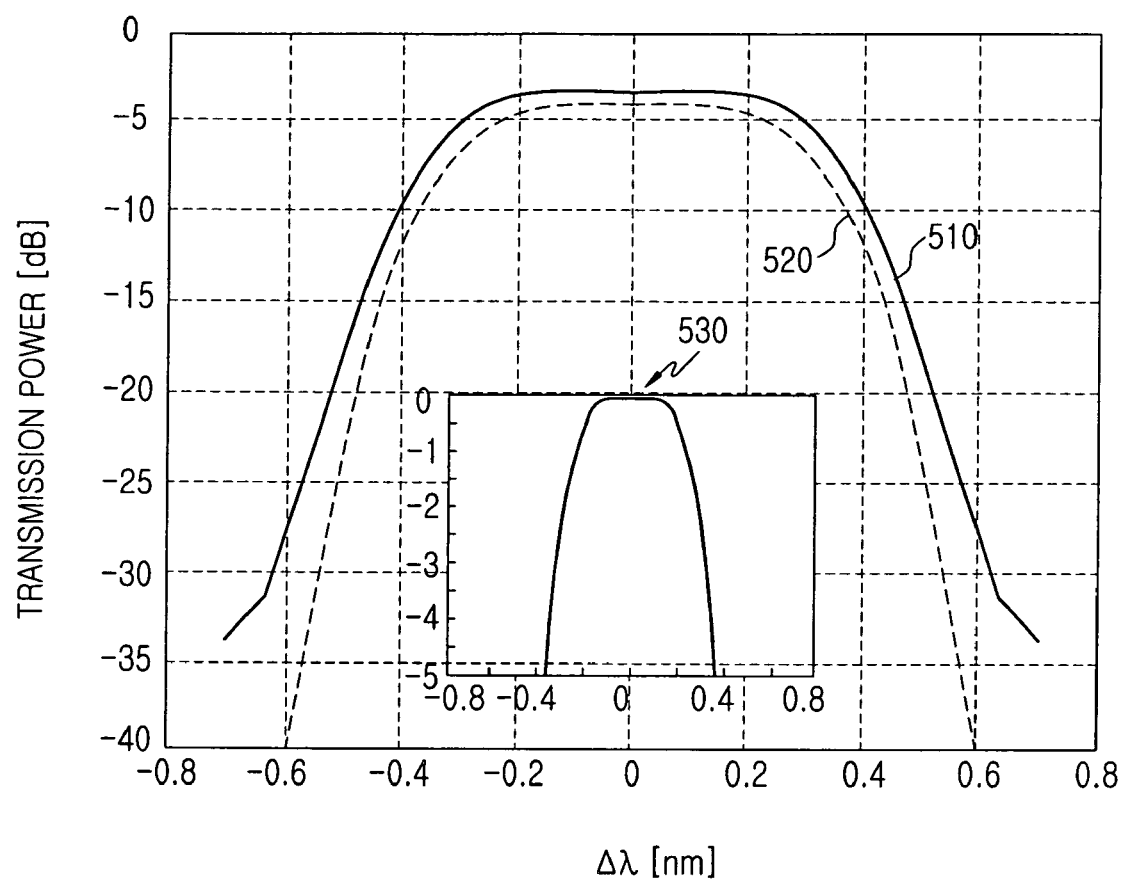

FIG. 9 shows a spectrum 520 of the first optical signal and a spectrum 510 of the second optical signal output from the wavelength division multiplexer 200. A $BW(\lambda_1)$ in the spectrum 520 of the first optical signal is 0.6494 nm and a $BW(\lambda_2)$ in the spectrum 510 of the second optical signal is 0.6496 nm. The $BW(\lambda_1)$ and the $BW(\lambda_2)$ are nearly identical to each other. Figures of merit (FOMs) of the O-band and C-band showing a ratio of 0.5/30 dB bandwidth are respectively 0.38 and 0.32. The two values of the figures of merit are similar to each other. A graph shown in FIG. 9 shows when the transmission loss in the two bands are equalized with each other (or when an offset is provided). As shown in FIG. 9, the two bands show similar characteristics which cannot be distinguished from each other.

As described above, mode widths of optical signals input to a slab waveguide differ from each other according to bands, so that transmission bandwidths in two bands can be equalized with each other or be similar to each other.

While the invention has been shown and described with reference to certain embodiments thereof, it will be understood by those skilled in the art that various changes in form and details may be made therein without departing from the spirit and scope of the invention as defined by the appended claims.

What is claimed is:

1. A dual-band wavelength division multiplexer including a first and a second slab waveguide, a plurality of channel waveguides connecting the first slab waveguide to the second slab waveguide, an input part connected to the first slab waveguide, and an output part connected to the second slab waveguide, wherein the input part comprising:

an input waveguide configured to receive an optical signal;

a wavelength division multiplexing filter connected to the input waveguide, arranged to output an optical signal in a first band to a first connecting waveguide, and output an optical signal in a second band to a second connecting waveguide;

a first mode converter connected to the wavelength division multiplexing filter through the first connecting waveguide and arranged to mode-convert the input optical signal in the first band; and a second mode converter connected to the wavelength division multiplexing filter through the second connecting waveguide and arranged to mode-convert the input optical signal in the second band, wherein the first mode converter is configured to receive the first band with center wavelength shorter than the center wavelength of the second band and wherein the output mode of the first mode converter has a width larger than that of the output mode of the second mode converter, and wherein the first mode converter is configured to output an output mode having a width different from that of an output mode output from the second mode converter.

2. The dual-band wavelength division multiplexer as claimed in claim 1, wherein the wavelength division multiplexing filter includes at least one element selected from the group consisting of a directional coupler, a multimode interference coupler, a Mach-Zender interferometer, and a thin film filter inserted into a planar lightwave circuit (PLC) substrate.

3. The dual-band wavelength division multiplexer as claimed in claim 1, wherein the first and the second mode converter each include at least one element selected from the group consisting of a Y-branch waveguide, a multimode interference coupler, a horn waveguide shaped like a parabola, and a polynomial waveguide.

4. The dual-band wavelength division multiplexer as claimed in claim 1, wherein the wavelength division multiplexing filter includes at least one element selected from the group consisting of a directional coupler, a multimode interference coupler, a Mach-Zender interferometer, and a thin film filter inserted into a planar lightwave circuit (PLC) substrate.

5. The dual-band wavelength division multiplexer as claimed in claim 4, wherein the first and the second mode converter each include at least one element selected from the group consisting of a Y-branch waveguide, a multimode interference coupler, a horn waveguide shaped like a parabola, and a polynomial waveguide.

6. A wavelength division multiplexer comprising:

a first and a second slab waveguide;

a plurality of channel waveguides connecting the first slab waveguide to the second slab waveguide;

input means connected to the first slab waveguide and configured to equalize transmission bandwidths of optical signals of different bands that are input to the first slab waveguide; and an output part connected to the second slab waveguide.

7. A wavelength division multiplexer according to claim 6, wherein the input means includes a wavelength division multiplexing filter, a first and a second connecting waveguide, and a first and a second mode converter.

* * * * *